July 1, 1969
C. GUNN-RUSSELL
3,453,053
ELECTRICAL APPARATUS FOR DETECTING CHANGES
IN THE QUALITY OF A MEDIUM
Filed March 17, 1965
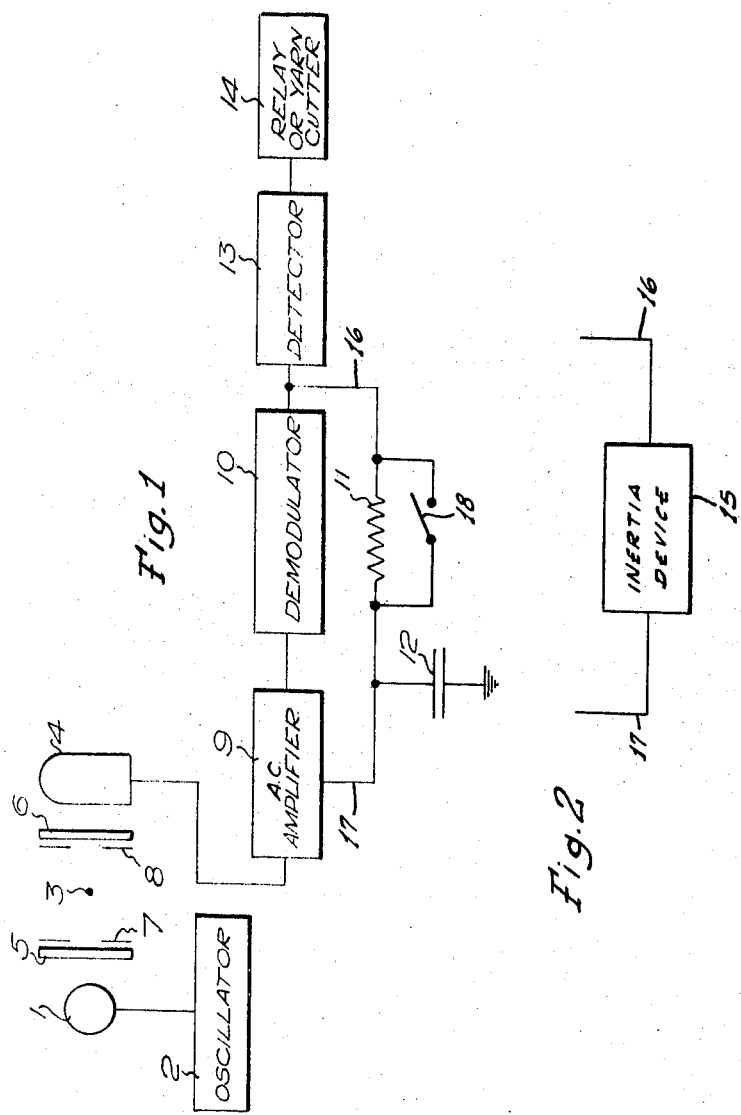
INVENTOR:
Charles Gunn-Russell

United States Patent Office 3,453,053
Patented July 1, 1969

3,453,053
ELECTRICAL APPARATUS FOR DETECTING CHANGES IN THE QUALITY OF A MEDIUM
Charles Gunn-Russell, London, England, assignor to Leesona Corporation, Warwick, R.I., a corporation of Massachusetts
Filed Mar. 17, 1965, Ser. No. 440,423
Int. Cl. G01n *21/16;* G01t *1/16;* H03k *5/18*
U.S. Cl. 356—200                                5 Claims

ABSTRACT OF THE DISCLOSURE

An optical sensing system is disclosed for measuring diameter of a moving yarn to detect not only slubs but also gradually changing diameter. To eliminate unwanted slow changes of optical sensing head characteristics caused from dust buildup, or the like, an A.G.C. system regulates gain for variations occurring over long time periods, but permits detection of signals from gradual changes. An A-C amplifier is used together with a pulse emitting light source driven by an oscillator to give the required signal characteristics.

---

This invention relates to electrical apparatus for detecting changes in quality of a medium, and is especially, although not exclusively, applicable to such apparatus which employs optical scanning means for the medium.

In one form of such apparatus, it may be used for detecting changes in thickness of filamentary material. For example, in the textile industry means are provided for eliminating slubs from spun yarn, for which purpose slub catchers have long been employed. Traditionally slub catchers have employed mechanical means for sensing the thickness of the yarn, and for cutting it whenever the thickness exceeds a predetermined value. However such slub catchers have proved to be unsatisfactory under certain conditions, for example with very thin yarns, and consequently various proposals have been made for generating a signal in response to the sensing means and for using this signal to control a yarn cutter. One sensing device which may be employed comprises optical scanning means for the yarn, but difficulties have been encountered when using such sensing means due to the dust to which it is exposed. The dust accumulates to interfere with the passage of light from the light source to the photo-electric cell, or other optical-electric transducer employed, and so a progressive reduction in the sensitivity of the apparatus results.

In sensing spun yarn it is usually required, not only to eliminate slubs, which constitute sudden changes in the diameter of the yarn, but also to eliminate other faults, such as spinners doubles, which may constitute only gradual changes in diameter, but which nevertheless may seriously affect the quality of the yarn being detected. In using an optical scanning device, or other device the sensitivity of which is likely to become reduced with the accumulation of dust, however, the apparatus cannot be relied upon to respond to those faults which constitute a gradual change in diameter of the yarn. It would be possible to alleviate this disadvantage by employing a second transducer exposed to the same conditions as the operative transducer, and employing this second transducer to generate a reference signal. However, such an arrangement would add materially to the cost of the apparatus.

The object of the invention is to provide electrical apparatus for detecting changes in the quality of a medium with a view to alleviating the disadvantages indicated above.

According to the invention there is provided electrical apparatus for detecting changes in quality of a medium comprising a scanning head for generating an A.C. electrical signal having an amplitude dependent upon said quality, an amplifying and demodulating device for said electrical signal incorporating automatic gain control responsive to the demodulated output of said demodulating means, said automatic gain control being applied via an inertia circuit of sufficient inertia to preserve in the demodulated output, frequency components above a predetermined frequency. This essentially is a filter circuit causing only relatively rapid changes to effect an A.G.C. action.

By generating an A.C. signal amplitude modulated in response to the quality of the medium, and deriving an automatic gain control signal from the demodulating means, the sensitivity of the apparatus is prevented from becoming reduced due to ambient conditions such as the accumulation of dust. The demodulated output is preferably applied to a detector which controls a relay or yarn cutter.

The inertia of the filtering effect circuit is chosen to be such that low frequencies, i.e. up to said predetermined frequency, do not occur in the demodulated output. Such low frequencies are those which would correspond to very slow changes in the amplitude of the A.C. signal due, for example, to the accumulation of dust on the medium or to changes in temperature. Nevertheless the predetermined frequency, in the case of apparatus for detecting changes in the diameter of yarn, is preferably arranged to be sufficiently low that changes in the amplitude of the A.C. signal which correspond to spinners doubles, or other defects which may produce much more gradual changes in yarn diameter than slubs, are detected. Moreover, in order to enable slubs to be detected, which are commonly only about 0.1 inch in length, at the usual yarn speeds, the apparatus must be capable of handling frequency components in the demodulated signal up to the order of kilocycles. At yarn speeds of from 300 to 1200 yards per minute, the ability to handle modulated signals of from 10 c.p.s. to 12 kc.p.s. is desirable. The frequency of the A.C. electrical signal, which constitutes a carrier for the frequencies which indicate quality changes in the medium, must, of course, be chosen to be substantially greater than the maximum frequency which is required to be detected.

In order that the invention may be clearly understood and readily carried into effect, it will now be more fully described with reference to the accompanying drawing in which FIG. 1 shows, mainly in block form, apparatus in accordance with one embodiment of the invention, and FIGURE 2 shows an alternative embodiment of an A.G.C. circuit.

Referring to the drawing the invention is shown by way of example, as applied to electrical apparatus for detecting changes in the diameter of spun yarn due to imperfections in the yarn. The apparatus comprises a scanning head for generating an A.C. electrical signal having an amplitude dependent upon the aforesaid diameter. The head incorporates, in this embodiment, a source of light 1 which is controlled by an oscillator 2 so as to emit pulses of light at the frequency required for the A.C.

electrical signal. Preferably the light source 1 is of the semi-conductor type, for example it may be a gallium arsenide emitter which is capable of emitting intense pulses of infra red light at a high frequency. Light from the source 1 is projected past yarn 3 emanating from a spinning machine, to a photo-electric transducer 4 employing a suitable optical projecting system. In the embodiment of the invention illustrated the optical system incorporates diffusers 5 and 6 and graticles 7 and 8, but these may be replaced by a system of lenses if desired. The transducer 4 may conveniently be a junction semiconductor transducer, which is suitably biased to produce, in response to the pulses of light falling on the junction from the light source 1, an A.C. electrical signal having an amplitude dependent upon the diameter of the yarn 3.

The output from the transducer 4 is amplified in an A.C. amplifier 9 and demodulated in a demodulator 10 which provides an automatic gain control voltage at lead 16 responsive to the demodulated output. The automatic gain control is applied to lead 17 of amplifier 9 via an inertia or filter circuit, which in the present embodiment is constituted by a circuit of long time constant imparted in conventional manner by a resistor 11 in conjunction with a grounded bias condenser 12 as shown. If desired the long time delay filtering action in the automatic gain control circuit may be provided by a thermistor such as represented by block 15 in FIGURE 2.

It will be appreciated that the demodulated output will contain frequencies which may range from a lower limit, of said predetermined frequency, corresponding to a small rate of change in the diameter of the yarn and determined by the inertia of the inertia circuit, to an upper limit determined by the greatest rate of change in diameter of the yarn which is encountered. The time constant of the circuit 11, 12, or the characteristics of the thermistor, is chosen so that said lower frequency limit is greater than those frequencies which correspond to environment changes, such as the accumulation of dust on the yarn or temperature changes. On the other hand the arrangement is such that said lower frequency limit is less than those frequencies which correspond to defects in the yarn which produce gradual changes in the yarn diameter, such as spinners doubles or drafting faults.

The demodulated output is applied to a detector 13 which, in the case of the higher frequencies which correspond to slubs in the yarn, controls a relay or yarn cutter 14. The detector may also be arranged to control the same or another relay or yarn cutter in response to lower frequencies in the demodulated output which correspond to such imperfections as spinners doubles or drafting faults, or alternatively the detector may be arranged to actuate a fault alarm device. Preferably the detector is made adjustable to suit different requirements regarding quality and types of yarn.

It will be understood that the provision of the automatic gain control renders the apparatus usable with yarn of any nominal diameter appropriate for the optical scanning system. A change to a yarn of greater diameter, say, has the effect of a reduction in the intensity of the light reaching the transducer which also corresponds to a reduction in the output of the light source. When the apparatus is first used the A.G.C. action normally adjusts itself for a substantially normal demodulated signal amplitude for any particular nominal diameter of the yarn to be sensed in a time which is dependent upon the inertia of the inertia circuit. In some cases, however, in order to detect slow changes in the yarn diameter, it may be necessary for the inertia to be provided by, or correspond with, a time constant of several seconds. In this event, in order that the time taken for the apparatus to adjust itself should not be too long, the time constant circuit may be provided with an optional short circuit path, for example operable by a push button 18, thereby enabling the apparatus to adjust itself at a rate independent of said inertia, i.e. almost instantaneously.

The detailed design of the circuitry within the blocks of the drawing is well within the skill of the art, and can conveniently be in the form of transistorized circuits on a printed circuit board.

Although the invention has been described with reference to one particular embodiment thereof, various modifications may be made to the apparatus described without departing from the scope of the invention. Thus, for example, the light source 1 and photo-electric transducer 4 may be replaced by other arrangements which generate an A.C. electrical signal having an amplitude dependent upon the diameter of the yarn. Moreover the apparatus may be used to detect other changes in quality and of other media, for example for detecting changes in thickness or density of substantially transparent films.

I claim:

1. In an optical sensing device for measuring variations in the diameter of a yarn moving past an optical sensing station, wherein the optical sensing device has a progressive reduction in sensitivity due to accumulation of dust and the like over extensive periods of time, apparatus for increasing sensitivity to detection of gradual changes in yarn diameter comprising in combination, optical sensing means at said optical sensing station, an oscillator having a frequency greater than that of the most rapid variations of diameter of the yarn to be detected, a light source coupled to said oscillator for producing pulses of light at said oscillator frequency and directed to said optical sensing means, an A-C amplifier coupled to said optical sensing means and tuned to said oscillator frequency for amplifying signals detected by said sensing means, the amplitude of said signals being dependent upon the diameter of said yarn, demodulator means coupled to said amplifier and providing an output signal representative of rates of change in the yarn diameter, automatic gain control means in said A-C amplifier to respond to input signals for adjusting the gain, means coupled between said demodulator means and said automatic gain control means responsive to signals persisting over a long time period for establishing the gain level of said amplifier independently from variations extending over short periods of time to establish an amplifier characteristic, whereby changes in demodulated signals produced from gradual changes in the yarn diameter are blocked from said automatic gain control means and changes in demodulated signals produced by changes in characteristics of the optical sensing station performance are passed to said automatic gain control means, and detection means coupled to said demodulator means for indicating departures from a predetermined yarn diameter by means of signal variations from said demodulator means.

2. Apparatus according to claim 1, wherein said means responsive to a signal persisting over a long period of time is a time constant circuit comprising a resistance and capacitor.

3. Apparatus according to claim 1, including means for selectively disabling said means responsive to signals persisting over a long time period.

4. Apparatus according to claim 1, wherein said light source is a semi-conductor source driven by said oscillator to emit pulses of light.

5. Apparatus according to claim 1 in which said optical sensing means is of the junction semi-conductor type.

References Cited

UNITED STATES PATENTS 2,654,288  10/1953  Savadelis.
2,699,701   1/1955  Strother et al.

(Other references on following page)

UNITED STATES PATENTS

| | | |
|---|---|---|
| 2,901,630 | 8/1959 | Vossberg. |
| 3,111,555 | 11/1963 | Dykeman et al. _____ 178—6.8 |
| 3,138,759 | 6/1964 | Thompson _____ 328—120 X |
| 3,185,924 | 5/1965 | Locher. |
| 3,257,559 | 6/1966 | McMullen. |
| 3,264,922 | 8/1966 | Peyer. |
| 3,275,744 | 9/1966 | Dietrich. |

OTHER REFERENCES

IBM Technical Disclosure Bulletin, vol. 2, No. 4, December 1959, pp. 66–67.

RONALD L. WIBERT, *Primary Examiner.*

WARREN A. SKLAR, *Assistant Examiner.*

U.S. Cl. X.R.

250—83.3; 328—120; 356—238